Patented Oct. 17, 1933

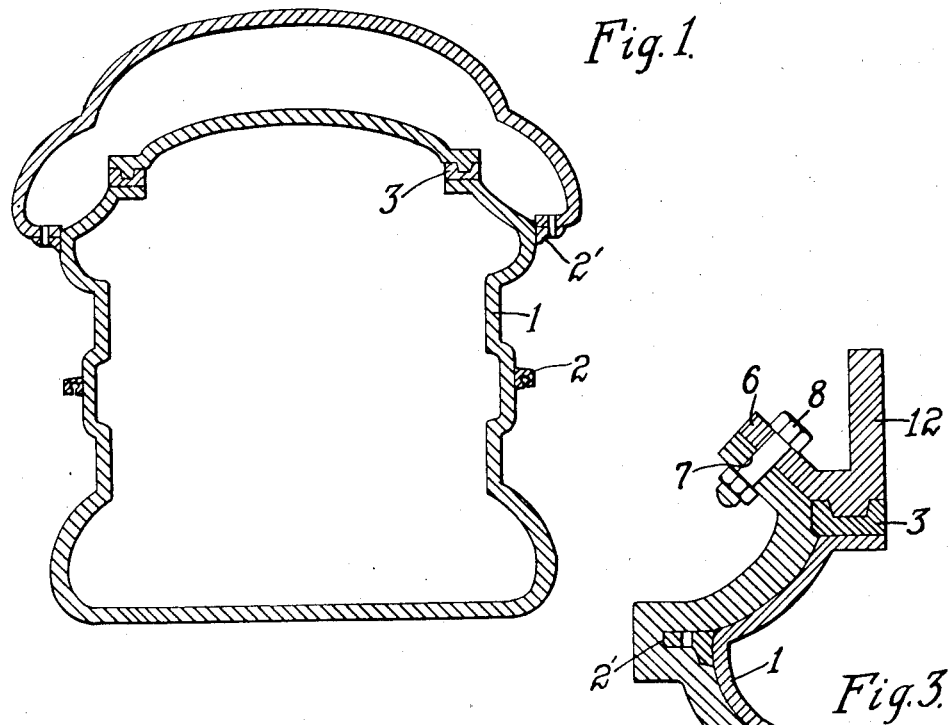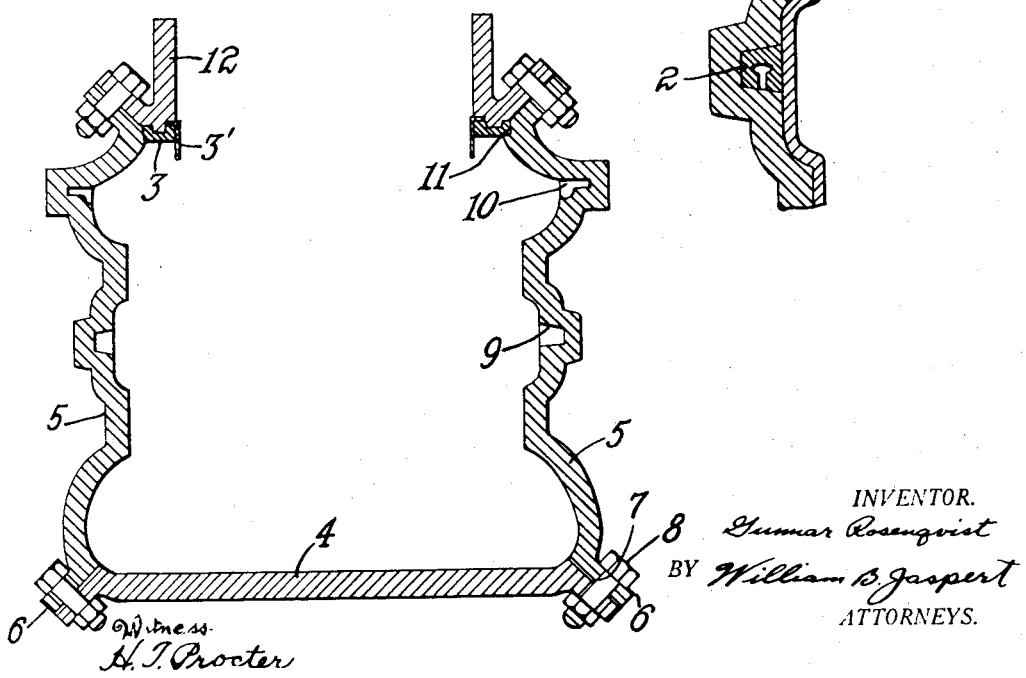

1,931,084

UNITED STATES PATENT OFFICE 1,931,084

MOLD FOR ARTICLES OF GALVANOPLASTIC MATERIAL

Gunnar Rosenqvist, Pittsburgh, Pa.

Application June 2, 1928. Serial No. 282,421

3 Claims. (Cl. 204—6)

This invention relates to molds for producing articles of galvanoplastic material having metal inserts formed integrally therewith and the present invention is a continuation in part of my co-pending application bearing Serial Number 149,089, filed November 18, 1926, which has now eventuated into Patent 1,711,542, dated May 7, 1929.

In the application referred to, I have disclosed a method of forming hollow articles such as burial receptacles of galvanoplastic material to constitute a seamless integral structure.

It is among the objects of the present invention to provide a mold for forming such articles and other articles of galvanoplastic material with inserts which are integrally joined with such articles in the process of making them. In the accompanying drawing constituting a part hereof, and in which like reference characters designate like parts, Fig. 1 is a cross-sectional view of a casket having metal inserts formed integrally therewith; Fig. 2 is a similar view of a mold for forming the article shown in Fig. 1 and embodying the principles of the present invention; and Fig. 3 is a cross-sectional view of an enlarged detail of the mold shown in Fig. 2 and the article formed thereby.

In the manufacture of articles by electrolytic deposition of metals it is sometimes desirable to form portions of the articles of heavy cross section to provide the requisite strength at such portions, or to provide an increased section for various purposes as for example hinge and handle brackets on caskets or the like.

In Fig. 1 the body portion 1 of the burial receptacle comprises a seamless one-piece structure formed of galvanoplastic metal by electrolytic deposition which is of substantially uniform wall thickness throughout. The casket is illustrated as being provided with handle brackets 2, hinged brackets 2' and a sealer frame 3 all of which are integrally joined with the body of the casket 1 in the following manner.

A sectional mold comprising a base 4, side walls 5 and end walls (not shown) and having flanges 6 provided with perforations 7 for receiving bolts or other suitable clamping members 8, is assembled to constitute a hollow mold which is capable of holding an electrolytic solution. The interior of the mold is formed to the shape of the exterior of the casket shown in Fig. 1, and the mold is provided with recesses 9 and 10 and cut out portions 11 corresponding in shape to the handle brackets 2, hinged brackets 2' and sealer frame 3 respectively.

The members 2, 2' and 3 are preformed by suitable machining operation or cast to their finished shape and are inserted in the openings 9, 10 and 11 in the manner shown in Fig. 3 of the drawing. It will be noted that the sealer frame 3 is secured by an extension member 12 which is clamped to the mold in the same manner as the several mold sections are joined. When the inserts are placed in their proper positions in the mold the interior surface of the latter which constitutes the matrix for forming the article of galvanoplastic metal is treated in the customary manner for the temporary reception of the material which is subsequently removed as the finished article by removing the sections of the mold. The surfaces of the inserts 2, 2' and 3 that lie contiguous with the matrix face of the mold are carefully cleaned for the reception of the material by galvanoplastic process and the mold is then filled with an electrolyte solution to a level above the effective molding surface which is above the sealer frame 3 in the figures of the drawing.

As shown in Fig. 2 the sealer frame 3 is clamped between the upright portion 12 and the side members 5 of the mold. To prevent the metal depositing on the side of the sealer frame 3, a liner 3' of rubber or other suitable material adapted to be free of deposits is secured in the manner shown.

The liner 3' is shown clamped between the frame 3 and upright 12 but may be secured in any convenient manner to isolate the side of the sealer frame from the electrolytic action of the solution contained in the mold.

Suitable anodes of scrap metal are then placed in the mold and the anodes and the mold constituting the cathode is connected to a suitable source of electric energy. The process of forming the deposition on the matrix of the mold is continued until an article of suitable wall thickness is formed. When the article is completed, the mold sections are separated and the inserts 2, 2' and 3 are removed with the article, having been integrally joined therewith during the forming of the galvanoplastic body.

I have found that metallic inserts joined to a galvanoplastic body of metal in the manner described is inseparable from the metal with which it is joined to the degree that stress failure and rupture will occur in the main body portion of the galvanoplastic metal in portions of the body remote from such insert and not in the section of the body adjacent the insert, thus indicating that the insert and galvanoplastic body are truly integral.

Although I have illustrated one embodiment of the invention in connection with the forming of burial receptacles, it will be observed that the invention may be applied to the manufacture of a variety of articles of different geometrical design and configurations by forming suitable molds with recesses for holding inserts without departing from the principles herein set forth.

I claim herein as my invention:

1. The combination with a cathode for immersion in an electrolyte and for reception thereon of a galvanoplastic wall, of a shield against deposition adjacent an end portion of the wall and extending in the general direction of the wall, said cathode having a portion extending into the electrolyte at an angle to and abutting the shield in such manner that the full edge of the wall has a smooth finish.

2. The combination with a cathode for immersion in an electrolyte and for reception thereon of a galvanoplastic wall, of a shield against deposition adjacent an end portion of the wall and extending in the general direction of the wall, said cathode having a portion extending into the electrolyte at an angle to and abutting the shield in such manner that the full edge of the wall has a smooth finish, at least a portion of the cathode abutting the shield being secured to and removable with the deposit wall and constituting a finished edge for the wall and a surface for the wall which is finished inwardly of the edge for a short distance on the rough or electrolyte side of the wall.

3. The combination with a cathode for immersion in an electrolyte and for reception thereon of a galvanoplastic wall, of a shield against deposition adjacent an end portion of the wall and extending in the general direction of the wall, said cathode having a portion extending into the electrolyte at an angle to and abutting the shield in such manner that the full edge of the wall has a smooth finish, said shield extending into the electrolyte beyond the abutting cathode portion.

GUNNAR ROSENQVIST.